United States Patent Office 2,889,249
Patented June 2, 1959

2,889,249

ANALGESIC COMPOSITIONS AND METHOD OF INDUCING ANALGESIA IN ANIMALS THEREWITH

Jay Morton Beiler, Wyndmoor, and Gustav J. Martin, Philadelphia, Pa., assignors to The National Drug Company, Philadelphia, Pa., a corporation of Delaware No Drawing. Application July 23, 1956
Serial No. 599,304

4 Claims. (Cl. 167—55)

This invention relates to and has for its object the provision of a novel series of highly effective analgesic compositions and the methods for preparing them.

Analgesic compounds, used to relieve pain without producing loss of consciousness, differ widely in chemical structure but induce similar physiological reactions. The milder analgesics, such as acetylsalicylic acid and acetophenetidin, are relatively safe and non-addicting. The more potent analgesics, such as morphine and its derivatives, as well as the new synthetic agents such as meperidine and methadone, though highly effective are dangerous because of the fact that they may produce addiction. These potent analgesics have a depressant action on the central nervous system. If a dose a bit higher than the analgesic dose is administered, toxic effects are observed and, at some levels, death may even result from depression of the central nervous system. Because of these facts, the use of potent analgesics must be very carefully regulated both with respect to frequency of administration and size of each individual dose. In view of the above, it is obvious that any means of obtaining the desired analgesic effect using a smaller amount of the dangerous drug would be highly valuable, particularly with the more potent analgesics; and such advantageous results are observed using the combinations of the present invention.

According to the concept of the present invention, the action of the analgesic is potentiated by concurrent administration of certain acetamides. Using these compositions, both an increase in intensity and extended duration of action is observed, so that smaller amounts of the medicinals are needed to obtain the analgesic effect. To show the advantages stemming from the compositions of the present invention, in vivo tests have been carried out using the method of M. Ercoli and N. N. Lewis, J. Pharmacol. Exptl. Therap. 84, 301 (1945). The tests were carried out using morphine (4 mg./k.) and allylbenzylacetamide (100 mg./k.) at the level at which the latter exerted no analgesic effect. The following data shows that an unexpected advantage, both in intensity and duration of effect, results from the invention.

TABLE I

| Time after administration (min.) | Time of Response to Stimulus (seconds) | | | | | |
|---|---|---|---|---|---|---|
| | 0 | 30 | 60 | 90 | 120 | 180 |
| Morphine | 4.2 | 6.2 | 7.1 | 5.9 | 4.6 | 4.4 |
| Morphine and allybenzylacetamide | 4.4 | 6.4 | 11.6 | 8.1 | 6.6 | 4.3 |

The acetamides of the present invention are those of the general formula

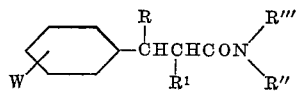

wherein W is a member of the group consisting of hydrogen, halogen, lower alkyl (e.g. methyl, ethyl, isopropyl, etc.) and lower alkoxy (e.g. methoxy, ethoxy, propoxy, etc.); R is a member of the group consisting of hydrogen, and lower alkyl (e.g. methyl, ethyl, isopropyl, etc.); R' is a member of the group consisting of allyl, cyclopentyl, and cyclopentenyl; R'' is a member of the group consisting of hydrogen, lower alkyl, lower alkenyl, and aryl-lower alkyl; and R''' is a member of the group consisting of hydrogen, lower alkyl, lower alkenyl, and aryl-lower alkyl, not more than one of the groups R'' and R''' being hydrogen. Preferred for use in the invention is the compound allylbenzylacetamide.

Methods are known for the preparation of these acetamides. A typical preparation involves condensing the desired hydrocarbon halide (R'X) with the desired dialkyl malonate (or an alkyl acetomide) in stoichiometric proportions in an anhydrous organ medium, such as an alcohol (e. g. ethanol, isopropanol, etc.), or toluene in the presence of an equimolecular amount of an alkali metal, an alkali metal alkoxide or an alkali metal hydride. The resulting product is then condensed with an alkyl-phenylalkyl halide.

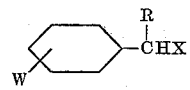

in the same manner; and the resulting ester is then hydrolyzed to the free diacid, which is in turn decarboxylated to the monoacid. This product is converted to the acid halide by means of a halogenating agent such as $SOCl_2$, $PCl_3$, or $PCl_5$, to form the final product.

Among the analgesics useful in the compositions of the invention are the salicylate analgesics (e.g. acetyl salicylic acid, etc.) cincophen and its derivatives, p-aminophenol derivatives (e. g. acetanilid, acetophenetidin, etc.), and pyrazolone derivatives (e. g. antipyrine, aminopyrine, etc.). Also useful in the invention are the non-opiate, addicting analgesics, such as meperidine hydrochloride, methadone hydrochloride, etc. Furthermore, opium principals and derivatives, such as morphine, codeine, ethylmorphine and diacetyl-morphine may be used. The acetamide component in the compositions of the invention (e.g. allylbenzylacetamide) is used in dosages of about 30–600 mg. and the analgesic component, used with the acetamide, is preferably included in amounts generally used. Thus, for example, the allylbenzylacetamide in 30–600 mg. portions could preferably be combined with the following potentiating amounts of characteristic analgesic materials:

| | Mg. |
|---|---|
| Acetylsalicylic acid | 30–600 |
| Cincophen | 100–1,000 |
| Acetophenetidin | 50–300 |
| Antipyrine | 100–600 |
| Morphine | 5–30 |
| Codeine | 6–60 |

In any case, use of the compositions of the invention result in an analgesic effect unexpectedly greater than that obtained using the analgesic ingredient alone.

The compositions of the invention may be administered in the same type of dosage unit forms as have been found useful for administration of the analgesics. Preferably, they may be prepared in tablet or capsule form and compounded to contain the usual excipients, fillers, dyestuffs, etc. For example, one may use starch, powdered cane sugar, lactose, etc. as fillers; and gum acacia, gelatin, corn syrup, etc. as binding agents. Lubricants, such as calcium or magnesium stearate, mineral oil, Carbowax or hydrogenated vegetable oil; and disintegrating agents such as corn syrup or potato starch, may also be used. In practice, a dry granulation is made containing the active ingredients, filler, binder and (if desired) dyestuff. This mixture is then compressed (e. g. in the standard single punch or rotary multiple punch machine or hand machines) to obtain the tablets. The tablets may be scored, if desired, to provide for smaller or fractional dosages.

When capsules are to be made, the granulations may be prepared as described above for the preparation of tablets, and the granulations then for capsule-filling in accordance with standard procedures. Hard capsules (made of gelatin and water and molded in two sections) are preferred.

Following are typical examples showing the preparation of compositions of the invention. It is to be specifically understood that these examples are illustrative only and not limitative of the invention.

*Example 1*

50 g. allylbenzylacetamide is mixed thoroughly with 150 g. acetylsalicylic acid and 15 g. starch. The mixed powder is compressed into slugs. The slugs are ground to a #14 mesh (U. S. standard sieve size) and recompressed into 1000 tablets, each containing 50 mg. allylbenzylacetamide and 150 mg. acetylsalicylic acid.

*Example 2*

50 g. allylbenzylacetamide is mixed thoroughly with 100 g. acetophenetidin and 10 g. starch. The mixture is granulated with corn syrup, dried, and screened to #14 mesh (U. S. standard sieve size) granules. Liquid petrolatum is added as a lubricant, and the granulation is compressed into 1000 tablets, each containing 50 mg. allylbenzylacetamide and 100 mg. acetophenetidin.

*Example 3*

50 g. allylbenzylacetamide is mixed thoroughly with 100 g. acetophenetidin and 10 g. starch. This mixture is used to fill 100 hard gelatin capsules.

*Example 4*

5 g. morphine sulfate, 50 g. allylbenzylacetamide, 60 g. powdered cane sugar, and 5 g. starch are mixed thoroughly, and granulated with a 10 percent solution of acacia. The granulation is dried and screened to a #14 mesh (U.S. standard sieve size). Magnesium stearate, 5 g. is mixed with the granulation, and 1000 tablets are compressed, each containing 5 mg. morphine sulfate and 50 mg. allylbenzylacetamide.

*Example 5*

5 g. morphine sulfate, 50 g. allylbenzylacetamide, 60 g. powdered cane sugar, and 5 g. magnesium stearate are mixed together thoroughly. This mixture is used to fill 1000 hard gelatin capsules.

This invention may be variously otherwise embodied within the scope of the appended claims.

We claim:

1. A composition of matter having analgesic activity which comprises 5 to 1000 parts by weight of an analgesic and from 30 to 600 parts by weight of alpha-allyl-alpha-benzylacetamide as a potentiating agent for said analgesic.

2. An article of manufacture comprising an analgesic and a potentiating agent therefor in dosage unit form which comprises 30 to 600 milligrams of alpha-allyl-alpha-benzylacetamide and 5 to 1000 milligrams of an analgesic of the group consisting of acetyl salicylic acid, cincophen, acetanilid, acetophenetidin, antipyrine, aminopyrine, meperidine hydrochloride, methadone hydrochloride, morphine, codeine, ethylmorphine and diacetylmorphine and a pharmaceutical carrier therefor.

3. An article of manufacture in dosage unit form comprising 5 to 30 milligrams of morphine and 30 to 600 milligrams of alpha-allyl-alpha-benzylacetamide as a potentiating agent for the analgesic activity of said morphine.

4. A method of inducing analgesia in animals which comprises the step of administering to said animals a potentiating amount of alpha-allyl-alpha-benzylacetamide with an analgesic whereby the activity of said analgesic agent is enhanced.

References Cited in the file of this patent

UNITED STATES PATENTS 2,675,340    Pilcher et al. _____ Apr. 13, 1954

OTHER REFERENCES

Micucci et al.: Exp. Med. and Surg., vol. 11 (1953), pp. 185–191.

Burger: "Medicinal Chem.," vol. 1, p. 131, Intersci. Publ. Inc., New York, 1951.

Wilson et al.: Organic Chemistry in Pharmacy, 1949, Lippincott, Phila., pages 130, 233–236.